(12) United States Patent
Davis (10) Patent No.: US 10,864,454 B1
(45) Date of Patent: Dec. 15, 2020

(54) INTERACTIVE AUDIO PLAYBACK CUBE

(71) Applicant: William Davis, Waxhaw, NC (US)

(72) Inventor: William Davis, Waxhaw, NC (US)

( * ) Notice: Subject to any disclaimer, the term of this patent is extended or adjusted under 35 U.S.C. 154(b) by 0 days.

(21) Appl. No.: 16/726,353

(22) Filed: Dec. 24, 2019

(51) Int. Cl.
*A63H 5/00* (2006.01)
*A63H 33/26* (2006.01)
*G06F 3/16* (2006.01)

(52) U.S. Cl.
CPC ............ *A63H 33/26* (2013.01); *A63H 5/00* (2013.01); *G06F 3/165* (2013.01); *A63H 2200/00* (2013.01)

(58) Field of Classification Search
CPC ............ A63H 33/26; A63H 5/00; G06F 3/165
USPC ............... 434/319, 171; 84/470 R, 476, 634, 84/600–602
See application file for complete search history.

(56) References Cited

U.S. PATENT DOCUMENTS

| | | | | |
|---|---|---|---|---|
| 3,304,651 A | * | 2/1967 | Deyerl | A63B 43/06 446/439 |
| 3,450,408 A | * | 6/1969 | Hagerman | A63H 33/26 273/146 |
| 4,124,881 A | * | 11/1978 | Haber | A63F 9/0415 362/253 |
| 4,298,198 A | * | 11/1981 | Huang | A63F 9/24 273/460 |
| 4,490,625 A | * | 12/1984 | Dilly | H01H 36/0066 307/116 |
| 4,651,613 A | * | 3/1987 | Harrison | G10F 1/06 434/159 |
| 4,836,075 A | * | 6/1989 | Armstrong | G10H 1/00 200/61.52 |
| 4,936,185 A | * | 6/1990 | Yamaguchi | G10H 1/32 84/670 |
| 5,058,894 A | * | 10/1991 | Levinn | A63F 9/0612 273/153 R |
| 5,573,440 A | * | 11/1996 | Schneider | A63H 33/00 446/404 |

(Continued)

FOREIGN PATENT DOCUMENTS

WO    2015042376    3/2015

OTHER PUBLICATIONS

Nyquest Technology Co, Magic Cube, 12/28/15, Youtube Video, 2 page (still frame).*

*Primary Examiner* — Eugene L Kim
*Assistant Examiner* — Matthew B Stanczak (57) ABSTRACT

The interactive audio playback cube is a recreational device. The interactive audio playback cube is an audio device. The interactive audio playback cube generates an illumination. The interactive audio playback cube comprises a housing and a control circuit. The housing contains the control circuit. The control circuit forms an audio device that converts one or more audio files into audible sound waves. The control circuit receives tactile control signals from the exterior surfaces of the housing. The control circuit generates the audible sound waves and a pattern of illumination based on the received tactile control signals. The control circuit is configured to wirelessly communicate with a personal data device. The control circuit transmits one or more audio files to the personal data device. The control circuit receives one or more audio files from the personal data device. The control circuit receives operating instruction from the personal data device.

17 Claims, 6 Drawing Sheets

(56) References Cited

U.S. PATENT DOCUMENTS

| | | | |
|---|---|---|---|
| 5,920,634 A * | 7/1999 | Chiquette | G09F 7/22 381/124 |
| 6,168,157 B1 * | 1/2001 | Beckman | A63F 9/24 273/237 |
| 6,238,263 B1 | 5/2001 | Bennett | |
| 6,353,168 B1 * | 3/2002 | Sosoka, Jr. | G10H 1/0008 446/397 |
| 6,366,758 B1 * | 4/2002 | Dunn | G09B 1/00 434/319 |
| 7,428,994 B1 * | 9/2008 | Jeffway, Jr. | A44C 15/0015 235/454 |
| 8,324,492 B2 * | 12/2012 | Feeney | G10H 1/26 84/615 |
| 8,585,409 B1 * | 11/2013 | Haywood | G09B 19/0076 434/127 |
| 8,987,576 B1 * | 3/2015 | Baxter | B67C 11/02 84/723 |
| 9,403,101 B2 | 8/2016 | Thomas | |
| 9,681,765 B2 | 6/2017 | Cignarella | |
| 9,937,428 B2 | 4/2018 | Nanda | |
| D818,054 S | 5/2018 | McLachian | |
| 10,004,369 B1 * | 6/2018 | Guidry | A47K 17/02 |
| 10,296,295 B1 | 5/2019 | Jackson | |
| 2003/0058740 A1 * | 3/2003 | Jincks | A01M 31/002 367/139 |
| 2006/0094328 A1 * | 5/2006 | Drosendahl | A63H 33/006 446/227 |
| 2008/0261486 A1 * | 10/2008 | Parajon | A63H 17/268 446/404 |
| 2011/0045736 A1 * | 2/2011 | Wooten | A63H 5/00 446/397 |
| 2011/0287688 A1 * | 11/2011 | Hang | A63H 23/10 446/153 |
| 2012/0256550 A1 * | 10/2012 | Akiyama | H05B 45/37 315/187 |
| 2012/0290853 A1 * | 11/2012 | He | H05B 45/37 713/300 |
| 2012/0295510 A1 * | 11/2012 | Boeckle | A61B 5/6896 446/72 |
| 2013/0040532 A1 * | 2/2013 | Khubani | A63H 3/02 446/369 |
| 2013/0130589 A1 * | 5/2013 | Cobb | A63F 9/24 446/485 |
| 2015/0049873 A1 * | 2/2015 | Buller | H04R 1/028 381/56 |
| 2015/0133023 A1 * | 5/2015 | Lewis | A63H 33/26 446/91 |
| 2015/0193193 A1 * | 7/2015 | Khaira | G06F 3/0414 381/109 |
| 2015/0202544 A1 | 7/2015 | Snee | |
| 2015/0217204 A1 * | 8/2015 | Howard | G06F 3/0362 446/484 |
| 2016/0121229 A1 * | 5/2016 | Guo | A63H 30/04 446/175 |
| 2016/0296851 A1 * | 10/2016 | Udairaj | A63H 33/26 |
| 2016/0375373 A1 * | 12/2016 | Fassbender | A63H 3/28 446/397 |
| 2017/0068514 A1 * | 3/2017 | Han | G06F 3/0482 |
| 2017/0106308 A1 * | 4/2017 | Wei | A63H 33/26 |
| 2018/0078735 A1 * | 3/2018 | Dalgleish | H04R 1/406 |
| 2018/0099525 A1 * | 4/2018 | Kim | B60B 19/006 |
| 2018/0221782 A1 * | 8/2018 | Almog | A63H 33/046 |
| 2018/0310743 A1 * | 11/2018 | Abukar | F21V 23/0435 |
| 2019/0022546 A1 * | 1/2019 | Fa Bender | A63H 33/26 |
| 2019/0030452 A1 * | 1/2019 | Fa Bender | A63H 33/00 |
| 2019/0262738 A1 * | 8/2019 | Hyslop | A63H 33/105 |

\* cited by examiner

INTERACTIVE AUDIO PLAYBACK CUBE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of human necessities including amusements and toys, more specifically, other toys. (A63H33/00)

SUMMARY OF INVENTION

The interactive audio playback cube is a recreational device. The interactive audio playback cube is an audio device. The interactive audio playback cube generates an illumination. The interactive audio playback cube comprises a housing and a control circuit. The housing contains the control circuit. The control circuit forms an audio device that converts one or more audio files into audible sound waves. The control circuit receives tactile control signals from the exterior surfaces of the housing. The control circuit generates the audible sound waves and a pattern of illumination based on the received tactile control signals. The control circuit is configured to wirelessly communicate with a personal data device. The control circuit transmits one or more audio files to the personal data device. The control circuit receives one or more audio files from the personal data device. The control circuit receives operating instruction from the personal data device.

These together with additional objects, features and advantages of the interactive audio playback cube will be readily apparent to those of ordinary skill in the art upon reading the following detailed description of the presently preferred, but nonetheless illustrative, embodiments when taken in conjunction with the accompanying drawings.

In this respect, before explaining the current embodiments of the interactive audio playback cube in detail, it is to be understood that the interactive audio playback cube is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the interactive audio playback cube.

It is therefore important that the claims be regarded as including such equivalent construction insofar as they do not depart from the spirit and scope of the interactive audio playback cube. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
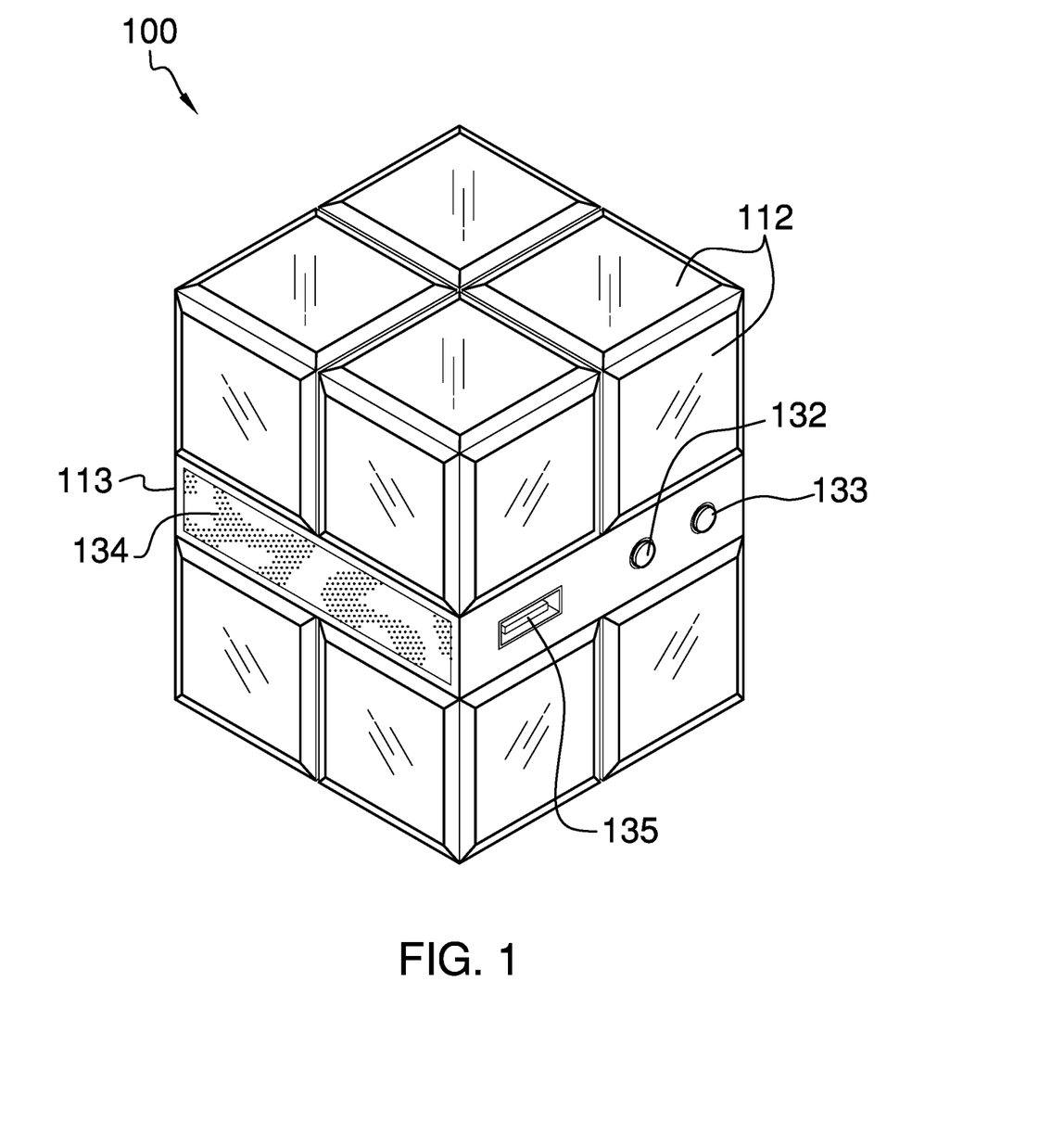
FIG. 1 is a perspective view of an embodiment of the disclosure.
Figure 2:
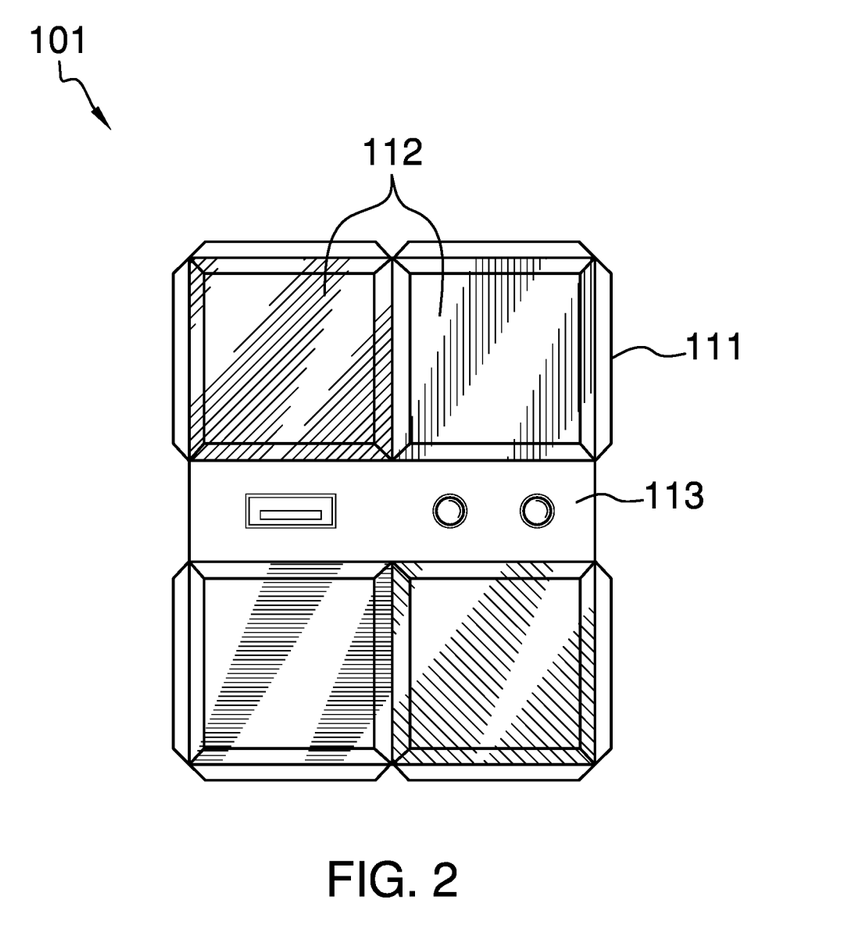
FIG. 2 is a front view of an embodiment of the disclosure.
Figure 3:
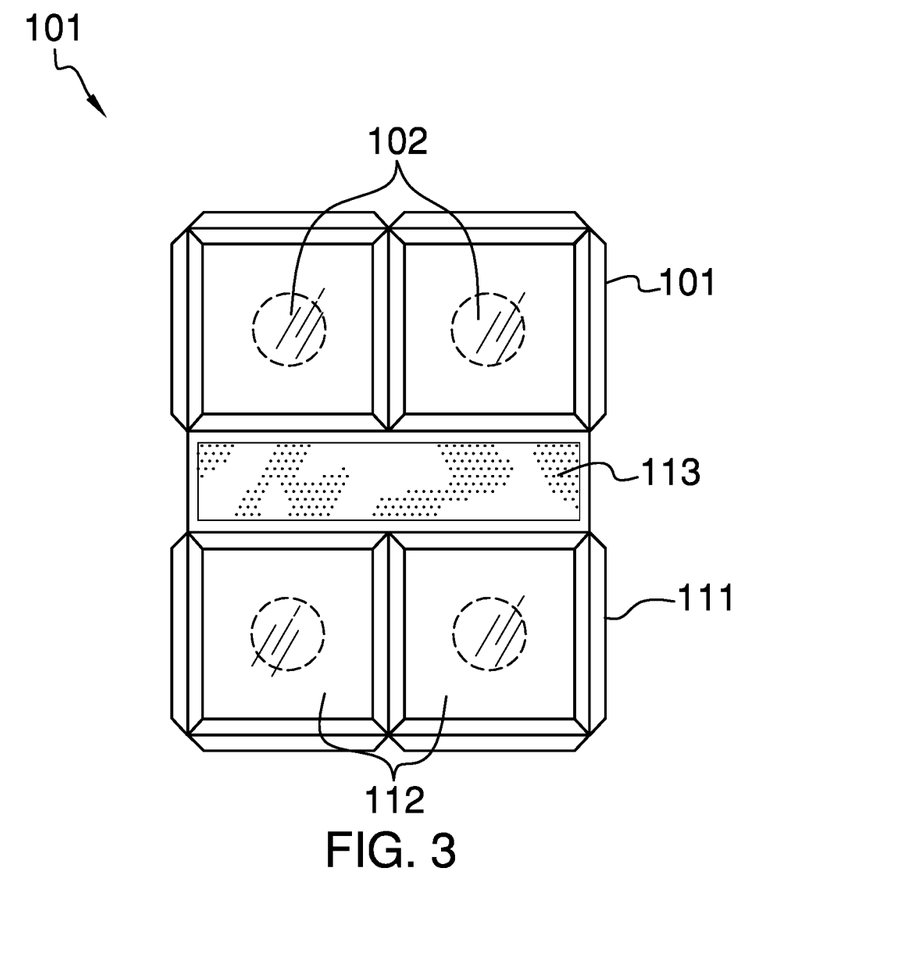
FIG. 3 is a side view of an embodiment of the disclosure.
Figure 4:
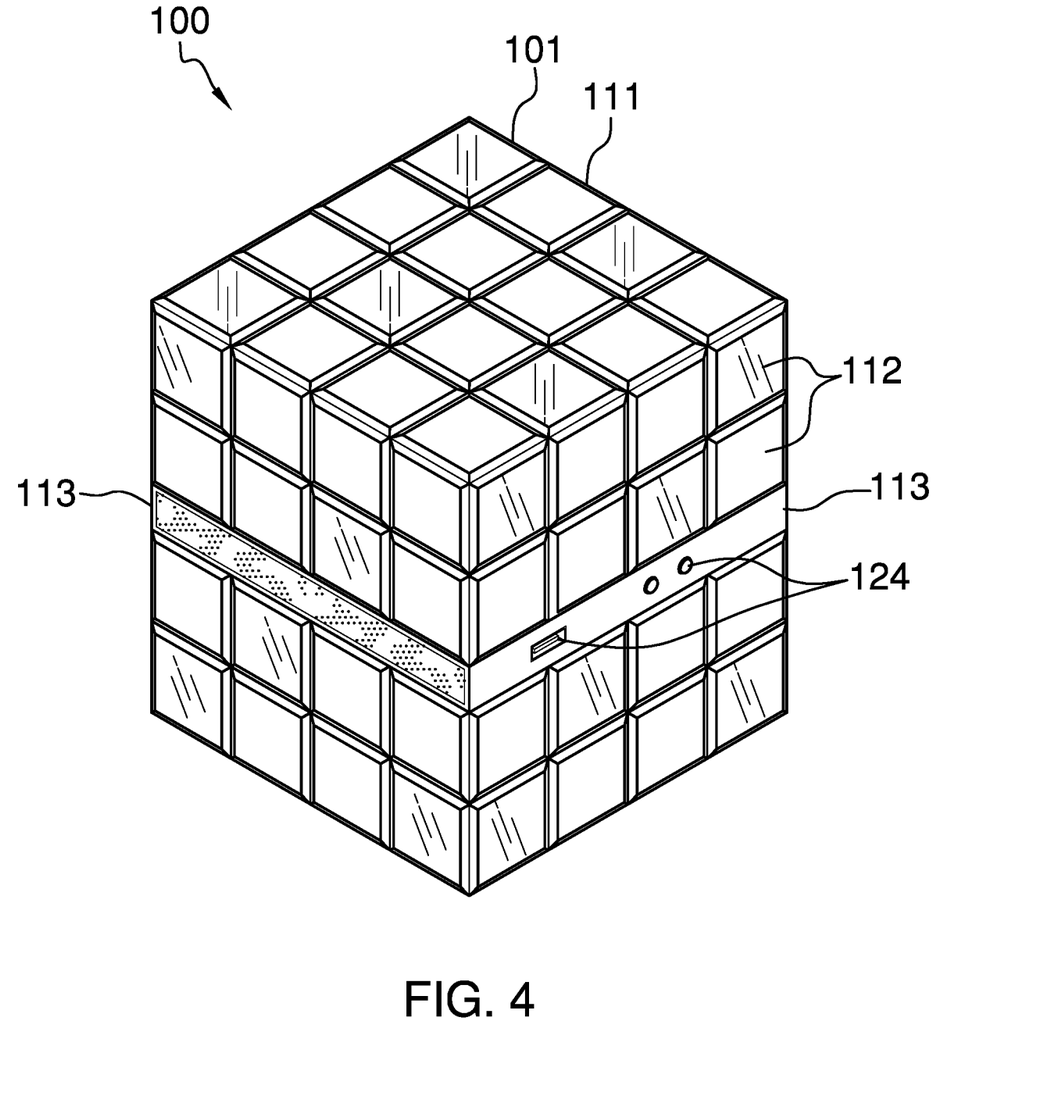
FIG. 4 is a perspective view of an embodiment of the disclosure.
Figure 5:
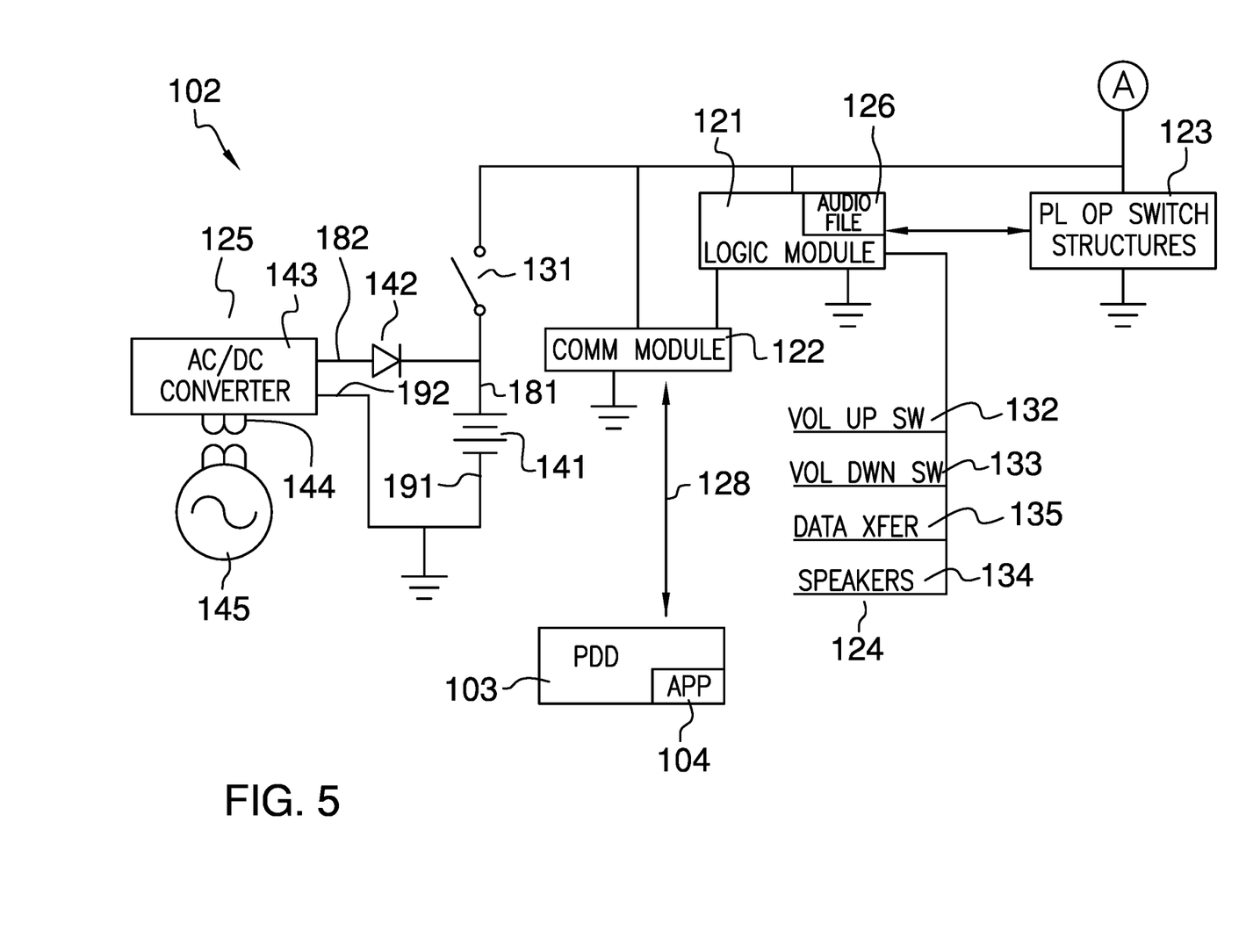
FIG. 5 is a schematic view of an embodiment of the disclosure.
Figure 6:
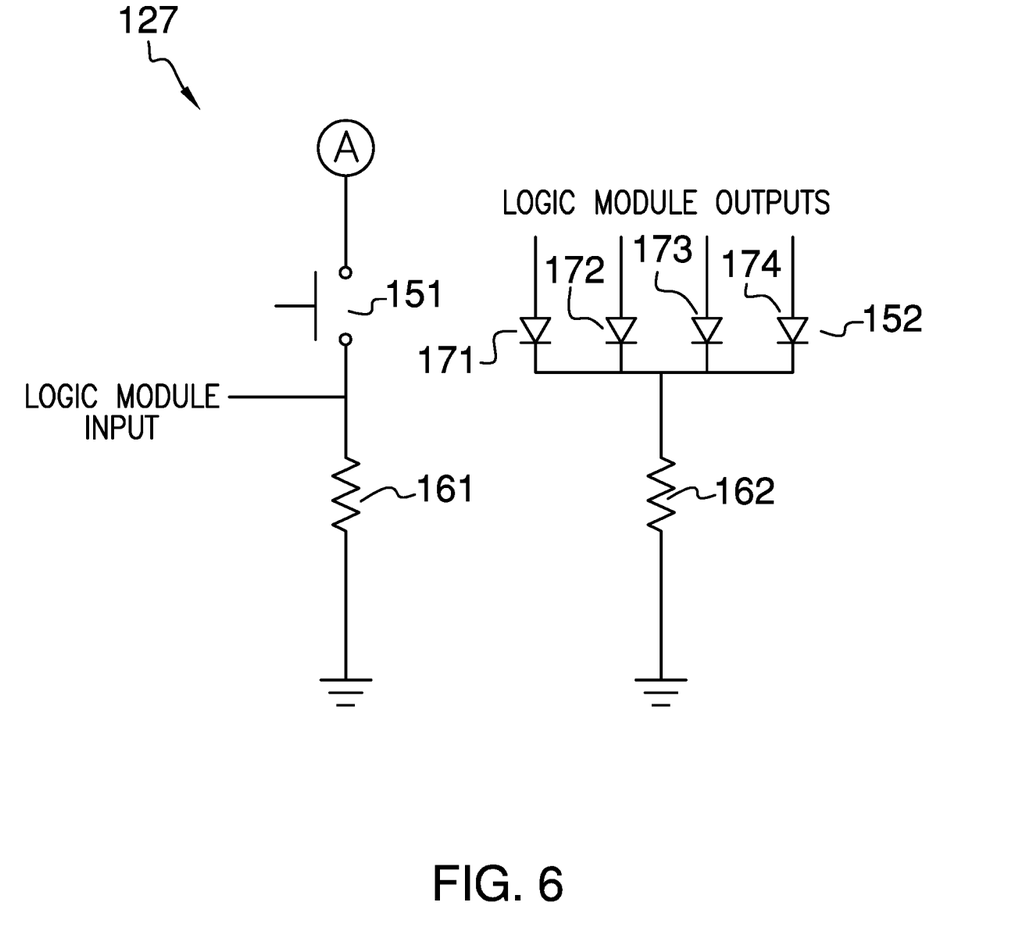
FIG. 6 is a detail schematic view of an embodiment of the disclosure.

Detailed reference will now be made to one or more potential embodiments of the disclosure, which are illustrated in FIGS. 1 through 6.

The interactive audio playback cube 100 (hereinafter invention) is a recreational device. The invention 100 is an audio device. The invention 100 generates an illumination. The invention 100 comprises a housing 101 and a control circuit 102. The housing 101 contains the control circuit 102. The control circuit 102 forms an audio device that converts one or more audio files 126 into audible sound waves. The control circuit 102 receives tactile control signals from the exterior surfaces of the housing 101. The control circuit 102 generates the audible sound waves and a pattern of illumination based on the received tactile control signals. The control circuit 102 is configured to wirelessly communicate with a personal data device 103. The control circuit 102 transmits one or more audio files 126 to the personal data device 103. The control circuit 102 receives one or more audio files 126 from the personal data device 103. The control circuit 102 receives operating instruction from the personal data device 103.

The personal data device 103 is a programmable electrical device that provides data management and communication services through one or more functions referred to as an application 104. The application 104 is a set of logical operating instructions that are performed by the personal data device 103. The addition of an application 104 will provide increased functionality for the personal data device 103. This disclosure assumes that an application 104 exists for the purpose of exchanging data with the invention 100.

Methods to design and implement an application 104 on a personal data device 103 are well known and documented in the electrical arts.

The housing 101 is a prism-shaped structure. The housing 101 has a rectangular block shape. The housing 101 is a fluid impermeable structure. The housing 101 is a rigid structure. The housing 101 contains the control circuit 102. The housing 101 is formed with all apertures and form factors necessary to allow the housing 101 to accommodate the use, the operation, and the external connections of the control circuit 102. Methods to form a housing 101 suitable for the purposes described in this disclosure are well-known and documented in the mechanical arts. The housing 101 comprises a cubic block structure 111, a plurality of face panels 112, and one or more interface panels 113.

The cubic block structure 111 is a prism-shaped structure. The cubic block structure 111 has a rectangular block shape. The cubic block structure 111 is a fluid impermeable structure. The cubic block structure 111 is formed with all apertures and form factors necessary to allow the cubic block structure 111 to accommodate the use, the operation, and the external connections of the control circuit 102. Methods to form a cubic block structure 111 suitable for the purposes described in this disclosure are well-known and documented in the mechanical arts.

Each face panel selected from the plurality of face panels 112 is a disk-shaped structure. Each face panel selected from the plurality of face panels 112 mounts on an exterior face of the cubic block structure 111 such that the selected face panel encloses an operational switch structure selected from the plurality of operational switch structures 123. Each face panel selected from the plurality of face panels 112 is a semitransparent structure. Each face panel selected from the plurality of face panels 112 passes through an illumination generated by its associated operational switch structure.

Each face panel selected from the plurality of face panels 112 forms a semi-rigid plate structure. The position of each selected faceplate relative to its associated operational switch structure is such that the deformation of the selected face panel actuates a switch contained in the associated operational switch structure. The actuation of the switch contained in the associated operational switch structure of the selected face panel generates a tactile control signal selected from the one or more tactile control signals that initiates an action by the control circuit 102.

Each interface panel selected from the one or more interface panels 113 is a disk-shaped structure. Each interface panel selected from the one or more interface panels 113 mounts on an exterior face of the cubic block structure 111. Each interface panel selected from the one or more interface panels 113 presents one or more interfaces selected from a plurality of interfaces 124 associated with the control circuit 102. Each interface panel selected from the one or more interface panels 113 allows the invention 100 to interoperate with externally provided electrical devices.

The control circuit 102 is an electric circuit. The control circuit 102 converts an audio file selected from the one or more audio files 126 into audible sounds. The control circuit 102 receives one or more tactile control signals from the exterior surfaces of the housing 101. The one or more tactile control signals determines the audio file selected from the one or more audio files 126 that is converted by the control circuit 102. The one or more tactile control signals initiates an illumination sequence that is generated by the control circuit 102. The illumination sequence generated by the control circuit 102 controls the location on the housing 101 of the illumination generated by the control circuit 102. The illumination sequence generated by the control circuit 102 controls the hue of the illumination generated by the control circuit 102.

The control circuit 102 forms a wireless communication link 128 with the personal data device 103. The control circuit 102 exchanges audio files selected from the one or more audio files 126 between the invention 100 and the personal data device 103 using the wireless communication link 128. The control circuit 102 receives operating instructions from the personal data device 103 using the wireless communication link 128.

The control circuit 102 is an independently powered electric circuit. By independently powered is meant that the control circuit 102 can operate without an electrical connection to an external power source 145.

The control circuit 102 comprises a logic module 121, a communication module 122, a plurality of operational switch structures 123, a plurality of interfaces 124, and a power circuit 125. The logic module 121, the communication module 122, the plurality of operational switch structures 123, the plurality of interfaces 124, and the power circuit 125 are electrically interconnected.

The logic module 121 is a readily and commercially available programmable electronic device that is used to manage, regulate, and operate the control circuit 102. Depending on the specific design and the selected components, the logic module 121 can be a separate component within the control circuit 102 or the functions of the logic module 121 can be incorporated into another component within the control circuit 102. The communication module 122 is a wireless electronic communication device that allows the logic module 121 to wirelessly communicate with a locally presented personal data device 103. Specifically, the communication module 122 establishes a wireless communication link 128 between the control circuit 102 and the locally presented personal data device 103. In the first potential embodiment of the disclosure the communication module 122 supports a communication protocol selected from the group consisting of a WiFi™ protocol or a Bluetooth™ protocol.

The logic module 121 further comprises one or more audio files 126. Each of the one or more audio files 126 is a digital representation of an electrical signal generated by the logic module 121 that is subsequently announced through the plurality of interfaces 124.

Each of the plurality of operational switch structures 123 is an electrical circuit. Each of the plurality of operational switch structures 123 generates a tactile control signal selected from the one or more tactile control signals. The logic module 121 individually monitors each of the plurality of operational switch structures 123. Each of the plurality of operational switch structures 123 generates a plurality of colors. Any hue selected from the plurality of colors is a hue selected from the group consisting of red, blue, green, and yellow. The logic module 121 selects the illumination hue for each of the plurality of operational switch structures 123. The plurality of operational switch structures 123 comprises a collection of individual switch structures 127.

Each individual switch structure 127 is an electric circuit. Each individual switch structure 127 generates a tactile control signal selected from the one or more tactile control signals. Each individual switch structure 127 generates a plurality of colors. Any hue selected from the plurality of colors is a hue selected from the group consisting of red, blue, green, and yellow. The logic module 121 monitors each individual switch structure 127. The logic module 121 selects the illumination hue for generated by the individual switch structure 127. Each individual switch structure 127 comprises a momentary switch 151, a plurality of LEDs 152, a first limit resistor 161, and a second limit resistor 162.

The momentary switch 151 is an electric switch that mounts underneath a face panel selected from the plurality of face panels 112. The momentary switch 151 is actuated when its selected face panel is physically deformed. The logic module 121 monitors the momentary switch 151. The actuation of the momentary switch 151 physically indicates to the logic module 121 the generation of a tactile control signal selected from the one or more tactile control signals from the exterior of the housing 101.

Each of the plurality of LEDs 152 is a two-terminal semiconductor device. Each LED selected from the plurality of LEDs 152 generates an illumination when a voltage is applied across the selected LED. Each LED selected from the plurality of LEDs 152 generates a hue selected from the group consisting of red, blue, green, and yellow. The logic module 121 controls the illumination of each of the plurality of LEDs 152. The logic module 121 can simultaneously illuminate one or more LEDs selected from the plurality of LEDs 152. The plurality of LEDs 152 comprises a red LED 171, a blue LED 172, a green LED 173, and a yellow LED 174.

The red LED 171 is an LED selected from the plurality of LEDs 152 that generates a red hue. The blue LED 172 is an LED selected from the plurality of LEDs 152 that generates a blue hue. The green LED 173 is an LED selected from the plurality of LEDs 152 that generates a green hue. The yellow LED 174 is an LED selected from the plurality of LEDs 152 that generates a yellow hue.

The first limit resistor 161 is an electric circuit element that is wired in a series circuit with the momentary switch 151. The first limit resistor 161 limits the flow of electricity through the momentary switch 151. The second limit resistor 162 is an electric circuit element that is wired to form a series circuit with each LED contained within the plurality of LEDs 152. The second limit resistor 162 limits the flow of electricity through the plurality of LEDs 152.

Each of the plurality of interfaces 124 is an information exchange structure that exchanges information between the control circuit 102 and an object selected from the group consisting of: a) a person; and, b) an externally provided electrical device. Each of the plurality of interfaces 124 mounts on an interface panel selected from the one or more interface panels 113. The logic module 121 controls the operation of each of the plurality of interfaces 124. The plurality of interfaces 124 comprises a master switch 131, an increase volume switch 132, a decrease volume switch 133, one or more speakers 134, and a data exchange port 135.

The master switch 131 is an electric switch. The master switch 131 is a maintained switch. The master switch 131 controls the flow of electric energy from the power circuit 125 to the balance of the control circuit 102.

The increase volume switch 132 is an electric switch. The increase volume switch 132 is a momentary switch. The logic module 121 monitors the increase volume switch 132. The increase volume switch 132 indicates to the logic module 121 a request to increase the volume of the audible sound generated by the control circuit 102. The decrease volume switch 133 is an electric switch. The decrease volume switch 133 is a momentary switch. The logic module 121 monitors the decrease volume switch 133. The decrease volume switch 133 indicates to the logic module 121 a request to decrease the volume of the audible sound generated by the control circuit 102.

Each of the one or more speakers 134 is a transducer. The logic module 121 controls the operation of the one or more speakers 134. Each of the one or more speakers 134 converts an electrical signal into an audible sound that is announced by each of the one or more speakers 134 into the space surrounding the exterior of the housing 101.

The data exchange port 135 is an electric structure. The logic module 121 controls the operation of the data exchange port 135. The data exchange port 135 electrically connects the logic module 121 to an externally provided data device.

The power circuit 125 is an electrical circuit. The power circuit 125 powers the operation of the control circuit 102. The power circuit 125 is an electrochemical device. The power circuit 125 converts chemical potential energy into the electrical energy required to power the control circuit 102.

The power circuit 125 further comprises a battery 141, a diode 142, an AC/DC converter 143, an inductive charging device 144, and an external power source 145. The battery 141 comprises a first positive terminal 181 and a first negative terminal 191. The external power source 145 comprises a second positive terminal 182 and a second negative terminal 192. The battery 141, the diode 142, the AC/DC converter 143, the inductive charging device 144, and the external power source 145 are electrically interconnected.

The battery 141 is an electrochemical device. The battery 141 converts chemical potential energy into the electrical energy used to power the control circuit 102. The battery 141 is a commercially available rechargeable battery 141. The chemical energy stored within the rechargeable battery 141 is renewed and restored through the use of the inductive charging device 144. The inductive charging device 144 is an electrical circuit that reverses the polarity of the rechargeable battery 141 and provides the energy necessary to reverse the chemical processes that the rechargeable battery 141 initially used to generate the electrical energy. This reversal of the chemical process creates a chemical potential energy that will later be used by the rechargeable battery 141 to generate electricity.

The inductive charging device 144 forms a wireless power transfer connection with an external power source 145. The inductive charging device 144 converts the received inductive energy into DC electric energy using an AC/DC converter 143. The diode 142 is an electrical device that allows current to flow in only one direction. The diode 142 installs between the rechargeable battery 141 and the AC/DC converter 143 such that electricity will not flow from the first positive terminal 181 of the rechargeable battery 141 into the second positive terminal 182 of the AC/DC converter 143. In the first potential embodiment of the disclosure, the AC/DC converter 143 is compatible with USB power requirements.

In the first potential embodiment of the disclosure, the illumination sequence generated by the control circuit 102 is a randomly generated sequence generated by the logic module 121. In the first potential embodiment of the disclosure, the audio file selected from the one or more audio files 126 is randomly selected from the logic module 121.

In a second potential embodiment of the disclosure, the selection of the audio file and the illumination sequence is determined from a previously programmed algorithm implemented by the logic module 121.

The following definitions were used in this disclosure:

AC: As used in this disclosure, AC is an acronym for alternating current.

AC/DC Converter: As used in this disclosure, an AC/DC converter is an electrical device that converts an AC voltage into a regulated DC voltage by rectifying and regulating the AC voltage. Method to design and build AC/DC converters are well known in the electrical arts. The AC/DC converter is further defined with a positive terminal, a negative terminal and a power input.

Algorithm: As used in this disclosure, an algorithm is a previously defined procedure used to perform a specified task.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Announce: As used in this disclosure, to announce means to generate audible sounds over a transducer.

Audio: As used in this disclosure, audio refers to the reproduction of a sound that simulates the sound that was originally created.

Audio Device: As used in this disclosure, an audio device is a device that generates audible sound waves.

Audio File: As used in this disclosure, an audio file is a digital representation of a sound that is used to store a recording of the sound. Separate hardware is used to convert the digital representation of the sound into an audible sound.

Audio Source: As used in this disclosure, an audio source is a device that generates electrical signals that can be converted into audible sounds by an audio device such as a speaker.

Battery: As used in this disclosure, a battery is a chemical device consisting of one or more cells, in which chemical energy is converted into electricity and used as a source of power. Batteries are commonly defined with a positive terminal and a negative terminal.

Bluetooth™: As used in this disclosure, Bluetooth™ is a standardized communication protocol that is used to wirelessly interconnect electronic devices.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Color: As used in this disclosure, a color refers to the visible portion of the spectrum that is reflected off of an object that is exposed to an external source of electromagnetic radiation. A color is often referred to as a shade.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Electric Circuit: As used in this disclosure, an electric circuit is a closed loop path through which electrons flow. The closed loop will generally initiate and terminate at an electrical power source.

External Power Source: As used in this disclosure, an external power source is a source of the energy that is externally provided to enable the operation of the present disclosure. Examples of external power sources include, but are not limited to, electrical power sources and compressed air sources.

Fluid: As used in this disclosure, a fluid refers to a state of matter wherein the matter is capable of flow and takes the shape of a container it is placed within. The term fluid commonly refers to a liquid or a gas.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Housing: As used in this disclosure, a housing is a rigid structure that encloses and protects one or more devices.

Hue: As used in this disclosure, a hue refers to a specific color.

Illumination: As used in this disclosure, light refers to electromagnetic radiation contained within an area. Illumination is a synonym for light, particularly in cases where a measure of the amount of visible electromagnetic radiation in a space is called for.

Induction: As used in this disclosure, induction refers to a process where a first process selected from the group consisting of an electric current or an electromagnetic field generates or interacts with a second process selected from the group consisting of an electric current or an electromagnetic field.

Inductive Charging Device: As used in this disclosure, an inductive charging device is an electrical device. The inductive charging device transfers energy from a first electric device to a second electric device. The first electric device transfers electric energy to the second electric device using induction.

Interface: As used in this disclosure, an interface is a physical or virtual boundary that separates two different systems across which information is exchanged.

LED: As used in this disclosure, an LED is an acronym for a light emitting diode. A light emitting diode is a diode that is also a light source.

Liquid: As used in this disclosure, a liquid refers to a state (phase) of matter that is fluid and that maintains, for a given pressure, a fixed volume that is independent of the volume of the container.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Maintained Switch: A used in this disclosure, a maintained switch is a switch that maintains the position that was set in the most recent switch actuation. A maintained switch works in an opposite manner to a momentary switch.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Parallel Circuit: As used in this disclosure, a parallel circuit refers to a method of electrically connecting a plurality of circuit elements to a voltage source. In a parallel circuit each circuit element receives a voltage equal to the full voltage produced by the voltage source.

Perimeter: As used in this disclosure, a perimeter is one or more curved or straight lines that bounds an enclosed area on a plane or surface. The perimeter of a circle is commonly referred to as a circumference.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones. See logical device Plate: As used in this disclosure, a plate is a smooth, flat and semi-rigid or rigid structure that has at least one dimension that: a) is of uniform thickness; and b) that appears thin relative to the other dimensions of the object. Plates often have a rectangular appearance. Plates often have a disk-like structure. The face of the plate is a surface of the plate selected from the group consisting of: a) the surface of the plate with the greatest surface area; b) the surface of the plate that is distal from the surface of the plate with the greatest surface area. The edges of the plate comprises the surfaces of the plate that would not be considered faces as defined above. As defined in this disclosure, plates may be made of any material, but are commonly made of metal, plastic, and wood. When made of wood, a plate is often referred to as a board or a plank.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Primary Shape: As used in this disclosure, the primary shape refers to a description of the overall geometric shape of an object that is assembled from multiple components.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Relaxed Shape: As used in this disclosure, a structure is considered to be in its relaxed state when no shear, strain, or torsional forces are being applied to the structure.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Semitransparent: As used in this disclosure, semitransparent refers to an object that is partially transparent.

Series Circuit: As used in this disclosure, a series circuit refers to a method of electrically connecting a plurality of circuit elements to a voltage source. In a series circuit, the proportion of the voltage received by each individual circuit element is divided proportionally between the plurality circuit elements based on the resistance (or impedance) of each circuit element relative to the total resistance of the plurality of circuit elements. The series circuit forms a linear or loop structure often referred to as a daisy chain.

Speaker: As used in this disclosure, a speaker is an electrical transducer that converts an electrical signal into an audible sound.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transducer: As used in this disclosure, a transducer is a device that converts a physical quantity, such as pressure or brightness into an electrical signal or a device that converts an electrical signal into a physical quantity.

Transparent: As used in this disclosure, transparent refers to a material that allows light to pass through the material without significant scattering such that an object can be clearly seen through the material.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

WiFi™: As used in this disclosure, WiFi™ refers to the physical implementation of a collection of wireless electronic communication standards commonly referred to as IEEE 802.11x.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An interactive audio playback device comprising a housing and a control circuit;
wherein the housing contains the control circuit;
wherein the interactive audio playback device is an audio device;
wherein the interactive audio playback device generates an illumination;
wherein the control circuit forms an audio device that converts one or more audio files into audible sound waves;
wherein the control circuit receives tactile control signals from an exterior surfaces of the housing;
wherein the control circuit generates the audible sound waves and a pattern of illumination based on the received tactile control signals;
wherein the housing comprises a cubic block structure, a plurality of face panels, and one or more interface panels;
wherein each face panel selected from the plurality of face panels mounts on an exterior face of the cubic block structure such that the selected face panel encloses an operational switch structure selected from a plurality of operational switch structures;
wherein each interface panel selected from a one or more interface panels mounts on an exterior face of the cubic block structure;
wherein the control circuit comprises a logic module, a communication module, a plurality of operational switch structures, a plurality of interfaces, and a power circuit;
wherein the logic module, the communication module, the plurality of operational switch structures, the plurality of interfaces, and the power circuit are electrically interconnected;
wherein each individual switch structure comprises a momentary switch, a plurality of LEDs, a first limit resistor, and a second limit resistor;
wherein the logic module monitors the momentary switch;
wherein the actuation of the momentary switch physically indicates to the logic module the generation of a tactile control signal selected from the one or more tactile control signals from the exterior of the housing;
wherein each of the plurality of LEDs is a two-terminal semiconductor device;
wherein the logic module controls the illumination of each of the plurality of LEDs;
wherein the logic module can simultaneously illuminate one or more LEDs selected from the plurality of LEDs;
wherein each LED selected from the plurality of LEDs generates an illumination when a voltage is applied across the selected LED;
wherein each LED selected from the plurality of LEDs generates a hue selected from the group consisting of red, blue, green, and yellow;
wherein the first limit resistor is an electric circuit element that is wired in a series circuit with the momentary switch;
wherein the first limit resistor limits the flow of electricity through the momentary switch;
wherein the second limit resistor is an electric circuit element that is wired to form a series circuit with each LED contained within the plurality of LEDs;
wherein the second limit resistor limits the flow of electricity through the plurality of LEDs.

2. The interactive audio playback device according to claim 1
wherein the control circuit is configured to wirelessly communicate with a personal data device;
wherein the control circuit transmits the one or more audio files to the personal data device;

wherein the control circuit receives the one or more audio files from the personal data device;
wherein the control circuit receives operating instruction from the personal data device.

3. The interactive audio playback device according to claim 2
wherein the housing is a prism-shaped structure;
wherein the housing is a fluid impermeable structure;
wherein the housing is a rigid structure.

4. The interactive audio playback device according to claim 3
wherein the control circuit is an electric circuit;
wherein the control circuit converts an audio file selected from the one or more audio files into audible sounds;
wherein the control circuit receives one or more tactile control signals from the exterior surfaces of the housing;
wherein the one or more tactile control signals determines the audio file selected from the one or more audio files that is converted by the control circuit;
wherein the one or more tactile control signals initiates an illumination sequence that is generated by the control circuit;
wherein the illumination sequence generated by the control circuit controls a location on the housing of an illumination generated by the control circuit;
wherein the illumination sequence generated by the control circuit controls a hue of the illumination generated by the control circuit.

5. The interactive audio playback device according to claim 4
wherein the control circuit is an independently powered electric circuit;
wherein by independently powered is meant that the control circuit can operate without an electrical connection to an external power source.

6. The interactive audio playback device according to claim 5
wherein the cubic block structure is a prism-shaped structure;
wherein the cubic block structure is a fluid impermeable structure;
wherein each face panel selected from the plurality of face panels is a disk-shaped structure;
wherein each face panel selected from the plurality of face panels is a semitransparent structure;
wherein each face panel selected from the plurality of face panels passes through an illumination generated by its associated operational switch structure;
wherein each face panel selected from the plurality of face panels forms a semi-rigid plate structure;
wherein a position of each selected faceplate relative to its associated operational switch structure is such that a deformation of the selected face panel actuates a switch contained in the associated operational switch structure;
wherein the actuation of the switch contained in the associated operational switch structure of the selected face panel generates a tactile control signal selected from the one or more tactile control signals that initiates an action by the control circuit;
wherein each interface panel selected from the one or more interface panels is a disk-shaped structure;
wherein each interface panel selected from the one or more interface panels presents one or more interfaces selected from a plurality of interfaces associated with the control circuit.

7. The interactive audio playback device according to claim 6
wherein the logic module is a programmable electronic device;
wherein the communication module is a wireless electronic communication device that allows the logic module to wirelessly communicate with a locally presented personal data device;
wherein the communication module establishes a wireless communication link between the control circuit and the locally presented personal data device.

8. The interactive audio playback device according to claim 7
wherein the logic module further comprises one or more audio files;
wherein each of the one or more audio files is a digital representation of an electrical signal generated by the logic module that is subsequently announced through the one or more interfaces.

9. The interactive audio playback device according to claim 8
wherein each of the plurality of operational switch structures is an electrical circuit;
wherein each of the plurality of operational switch structures generates a tactile control signal selected from the one or more tactile control signals;
wherein the logic module individually monitors each of the plurality of operational switch structures;
wherein each of the plurality of operational switch structures generates a plurality of colors;
wherein any hue selected from the plurality of colors is a hue selected from the group consisting of red, blue, green, and yellow;
wherein the logic module selects the hue for each of the plurality of operational switch structures.

10. The interactive audio playback device according to claim 9
wherein each of the one or more interfaces is an information exchange structure that exchanges information between the control circuit and an object selected from the group consisting of: a) a person; and, b) an externally provided electrical device;
wherein each of the one or more interfaces mounts on an interface panel selected from the one or more interface panels;
wherein the logic module controls the operation of each of the plurality of interfaces.

11. The interactive audio playback device according to claim 10
wherein the power circuit is an electrical circuit;
wherein the power circuit powers the operation of the control circuit;
wherein the power circuit is an electrochemical device;
wherein the power circuit converts chemical potential energy into the electrical energy required to power the control circuit;
wherein the power circuit further comprises a battery, a diode, an AC/DC converter, an inductive charging device, and an external power source;
wherein the battery comprises a first positive terminal and a first negative terminal;
wherein the external power source comprises a second positive terminal and a second negative terminal;
wherein the battery, the diode, the AC/DC converter, the inductive charging device, and the external power source are electrically interconnected.

12. The interactive audio playback device according to claim 11
- wherein the plurality of operational switch structures comprises a collection of individual switch structures;
- wherein each individual switch structure is an electric circuit;
- wherein each individual switch structure generates a tactile control signal selected from the one or more tactile control signals;
- wherein each individual switch structure generates a plurality of colors;
- wherein any hue selected from the plurality of colors is a hue selected from the group consisting of red, blue, green, and yellow;
- wherein the logic module monitors each individual switch structure;
- wherein the logic module selects the illumination hue for generated by the individual switch structure.

13. The interactive audio playback device according to claim 12
- wherein the momentary switch is an electric switch that mounts underneath a face panel selected from the plurality of face panels;
- wherein the momentary switch is actuated when its selected face panel is physically deformed.

14. The interactive audio playback device according to claim 13
- wherein the plurality of LEDs comprises a red LED, a blue LED, a green LED, and a yellow LED;
- wherein the red LED is an LED selected from the plurality of LEDs that generates a red hue;
- wherein the blue LED is an LED selected from the plurality of LEDs that generates a blue hue;
- wherein the green LED is an LED selected from the plurality of LEDs that generates a green hue;
- wherein the yellow LED is an LED selected from the plurality of LEDs that generates a yellow hue.

15. The interactive audio playback device according to claim 14
- wherein the plurality of interfaces comprises a master switch, an increase volume switch, a decrease volume switch, one or more speakers, and a data exchange port;
- wherein the master switch is an electric switch;
- wherein the master switch controls the flow of electric energy from the power circuit into the balance of the control circuit;
- wherein the increase volume switch is an electric switch;
- wherein the decrease volume switch is an electric switch;
- wherein the logic module monitors the increase volume switch;
- wherein the logic module monitors the decrease volume switch;
- wherein each of the one or more speakers is a transducer;
- wherein the logic module controls the operation of the one or more speakers;
- wherein the data exchange port is an electric structure;
- wherein the logic module controls the operation of the data exchange port.

16. The interactive audio playback device according to claim 15
- wherein the master switch is a maintained switch;
- wherein the increase volume switch is a momentary switch;
- wherein the increase volume switch indicates to the logic module a request to increase the volume of the audible sound generated by the control circuit;
- wherein the decrease volume switch is a momentary switch;
- wherein the decrease volume switch indicates to the logic module a request to decrease the volume of the audible sound generated by the control circuit;
- wherein each of the one or more speakers converts an electrical signal into an audible sound that is announced by each of the one or more speakers into the space surrounding the exterior of the housing;
- wherein the data exchange port electrically connects the logic module to an externally provided data device.

17. The interactive audio playback device according to claim 16
- wherein the battery is a rechargeable battery;
- wherein the inductive charging device is an electrical circuit that reverses the polarity of the rechargeable battery and provides the energy necessary to reverse the chemical processes that the rechargeable battery initially used to generate the electrical energy;
- wherein the inductive charging device forms a wireless power transfer connection with an external power source;
- wherein the inductive charging device converts the received inductive energy into DC electric energy using an AC/DC converter;
- wherein the diode is an electrical device that allows current to flow in only one direction;
- wherein the diode installs between the rechargeable battery and the AC/DC converter such that electricity will not flow from the first positive terminal of the rechargeable battery into the second positive terminal of the AC/DC converter.

* * * * *